United States Patent
Sevindik

(10) Patent No.: US 9,930,634 B1
(45) Date of Patent: Mar. 27, 2018

(54) SYSTEMS AND METHODS FOR EFFICIENT UPDATING OF TRACKING AREA INFORMATION FOR RELAY BASED NETWORKS

(71) Applicant: Sprint Spectrum LP, Overland Park, KS (US)

(72) Inventor: Volkan Sevindik, Fairfax, VA (US)

(73) Assignee: Sprint Spectrum L.P., Overland Park, KS (US)

(*) Notice: Subject to any disclaimer, the term of this patent is extended or adjusted under 35 U.S.C. 154(b) by 160 days.

(21) Appl. No.: 14/736,321

(22) Filed: Jun. 11, 2015

(51) Int. Cl.
*H04W 24/00* (2009.01)
*H04W 64/00* (2009.01)
*H04W 8/08* (2009.01)
*H04W 72/12* (2009.01)
*H04W 4/02* (2018.01)

(52) U.S. Cl.
CPC ............ *H04W 64/00* (2013.01); *H04W 4/02* (2013.01); *H04W 8/08* (2013.01); *H04W 72/1205* (2013.01)

(58) Field of Classification Search
CPC ......... H04W 64/00; H04W 4/02; H04W 8/08; H04W 72/1205; H04W 60/00; H04W 84/00; H04W 84/045
USPC ............................................. 455/456.1–457
See application file for complete search history.

(56) References Cited

U.S. PATENT DOCUMENTS

| 2013/0090123 A1* | 4/2013 | Gunnarsson | H04B 7/15528 455/450 |
| 2013/0337797 A1 | 12/2013 | Ban et al. | |
| 2013/0344890 A1* | 12/2013 | Hahn | H04W 60/00 455/456.1 |
| 2015/0004969 A1* | 1/2015 | Han | H04W 52/0251 455/434 |

* cited by examiner

*Primary Examiner* — Erica Navar

(57) ABSTRACT

Systems and methods are described for updating tracking information for a relay-based network. Tracking information for wireless devices connected to a plurality of cells that are connected to a relay are accumulated. The wireless device tracking information is formatted into a single tracking area update message for the wireless devices of the plurality of cells. Further, wireless transmission of the tracking area update message is scheduled.

15 Claims, 6 Drawing Sheets

| CELL ID 710 | WD IDENTIFICATION INFORMATION 720 | WD RELAY AREA 730 |
|---|---|---|
| | WIRELESS DEVICE ID 721 | LOCATION OF WIRELESS DEVICE 731 |
| | WIRELESS DEVICE ID 722 | LOCATION OF WIRELESS DEVICE 732 |
| CELL ID 712 | WD IDENTIFICATION INFORMATION 740 | WD RELAY AREA 750 |
| | WIRELESS DEVICE ID 741 | LOCATION OF WIRELESS DEVICE 751 |
| | WIRELESS DEVICE ID 742 | LOCATION OF WIRELESS DEVICE 752 |
| CELL ID 714 | WD IDENTIFICATION INFORMATION 760 | WD RELAY AREA 770 |
| | WIRELESS DEVICE ID 761 | LOCATION OF WIRELESS DEVICE 771 |
| | WIRELESS DEVICE ID 762 | LOCATION OF WIRELESS DEVICE 772 |

FIG. 5

SYSTEMS AND METHODS FOR EFFICIENT UPDATING OF TRACKING AREA INFORMATION FOR RELAY BASED NETWORKS

TECHNICAL BACKGROUND

Telecommunication systems, such as cellular networks or other wireless networks, may use tracking area information to locate wireless devices within a coverage area of the network so that data may be directed to the wireless devices. The tracking area information may be periodically updated, such as when wireless devices are mobile and change location from one tracking area to another. The tracking area update information may be transmitted via a relay in some networks, which can result in the use of resources otherwise available for data transmission. Systems that efficiently transmit tracking area information for relay based networks may be able to provide a high quality service to users of the system.

OVERVIEW

Systems and methods are described for efficiently updating tracking area information for relay based networks. The systems and methods include accumulating tracking information for wireless devices connected to a plurality of cells that are connected to a relay. The systems and methods further include formatting the wireless device tracking information into a single tracking area update message for the wireless devices of the plurality of cells. Further, wireless transmission of the tracking area update message is scheduled.

BRIEF DESCRIPTION OF THE DRAWINGS

FIG. 5 illustrates exemplary tables of wireless device identification and location information.

DETAILED DESCRIPTION

The various exemplary embodiments described herein contemplate systems and methods for efficiently updating tracking area information for relay based networks. The systems and methods of the various exemplary embodiments use tracking information messages that combine the tracking information for the wireless devices of a plurality of cells into a single message so that the message may have a compressed format and be sent with less frequently. As a result, less signaling overhead is used for tracking information messages, which permits more capacity for other traffic. Further, the cells referenced in the message may be small cells, such as a microcell, a picocell, or a femtocell.

Figure 1:
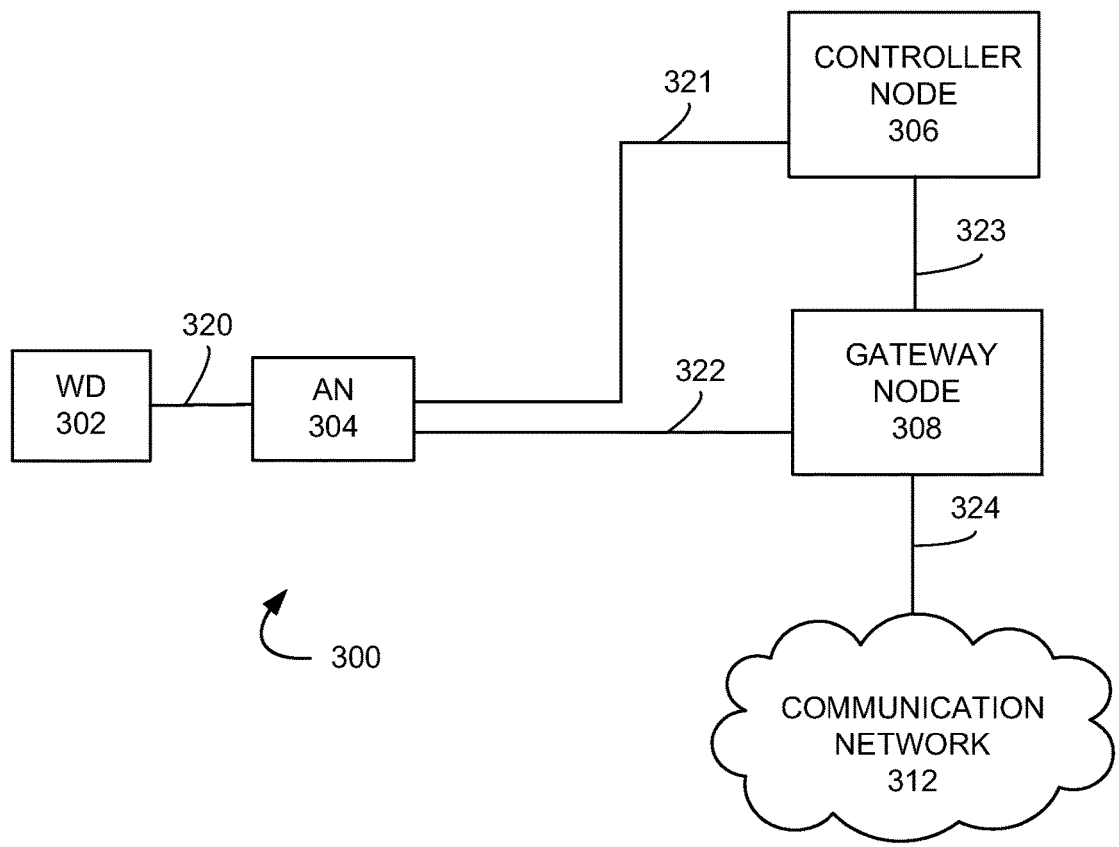
FIG. 1 illustrates an exemplary communication system capable of communicating with a wireless device.

FIG. 1 illustrates another exemplary communication system 300 to communicate with one or more wireless devices, such as to transmit tracking area information. Communication system 300 may comprise wireless device 302, access node 304, controller node 306, gateway node 308, communication network 312, and communication links 320-324. Other network elements may be present in communication system 300 to facilitate communication but are omitted for clarity, such as base stations, base station controllers, gateways, mobile switching centers, dispatch application processors, relays, and location registers such as a home location register or visitor location register. Furthermore, other network elements may be present to facilitate communication between access node 304 and communication network 312 that are omitted for clarity, including additional processing nodes, routers, gateways, and physical and/or wireless data links for carrying data among the various network elements.

System 300 may use a plurality of carriers to provide wireless communication services, according to an exemplary embodiment. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may be further divided into subcarriers. According to an exemplary embodiment, a frequency band may comprise a carrier, a channel, a subcarrier, a plurality of any of these, or any other suitable frequency band.

Wireless device 302 can be any device configured to communicate over communication system 300 using a wireless communication link. For example, wireless device 302 can include a cell phone, a smart phone, a computing platform such as a laptop, palmtop, or a tablet, a personal digital assistant, or an internet access device, and combinations thereof. Wireless device 302 can transmit and/or receive information over system 300 using various communication services. These services can include various voice, data, and/or MBMS services and applications. Such services may include, for example, mobile voice services, mobile data services, push-to-talk services, internet services, web browsing, email, pictures, picture messaging, video, video messaging, broadcast video, audio, voicemail, music MP3's, ring tones, stock tickers, new alerts, etc. Although a single wireless device 302 is depicted in the exemplary embodiment of FIG. 1, other numbers of wireless devices may be used in communication system 300 and the various exemplary embodiments disclosed herein.

Access node 304 is a network node capable of providing wireless communications to wireless device 302. Access node 304 can be, for example, a base transceiver station, a radio base station, an eNodeB device, or transmitter used for a small cell. According to an exemplary embodiment, access node 304 can comprise a serving access node for wireless device 302. Access node 304 may communicate with controller node 306 over communication link 321 and with gateway node 308 over communication link 322. When communication system 300 includes a plurality of access nodes (not shown in the exemplary embodiment of FIG. 1), the access nodes may communicate directly with each other over communication links (not shown in FIG. 1) linking the various access nodes to one another.

Access node 304 can be any network node configured to provide communication between wireless device 302 and communication network 312 (e.g., via gateway node 308). For example, access node 304 can be a short range access node (e.g., for a small cell) or a standard access node. According to an exemplary embodiment, a short range access node could include a microcell base station, a picocell base station, a femtocell base station, or the like for a small cell. Such small cells may have a signal area (e.g., an area around access node 304 where a wireless device may detect wireless signals transmitted from access node 304 at a signal level above a threshold) ranging from, for example, about 10 meters to about 2 kilometers. A standard access node (e.g., for a macro cell) could include a base transceiver station, a radio base station, an eNodeB device, or an enhanced eNodeB device, or the like. As such, a macro cell may transmit wireless signals with a greater signal level (e.g., use a higher transmission power) than a small cell. It is further noted that while one access node 304 is illustrated in the exemplary embodiment of FIG. 1, any number of access nodes can be implemented within system 100. The various access nodes may be of the same type (e.g., for macro cells or for small cells) or may be of various types (e.g., including both macro cells and small cells), such as to provide a heterogeneous network.

Controller node 306 can be any network node configured to manage services within system 300. Controller node 306 may provide other control and management functions for system 300. Controller node 306 can be a single device having various functions or a plurality of devices having differing functions, according to an exemplary embodiment. For example, controller node 306 can include at least one of a multi-cell/multicast coordination entity (MCE), a mobility management entity (MME), a radio network controller (RNC), a mobile switching center (MSC), and combinations thereof.

According to an exemplary embodiment, controller node 306 can comprise a processor and associated circuitry to execute or direct the execution of computer-readable instructions to obtain information. Controller node 306 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 306 can receive instructions and other input at a user interface, according to an exemplary embodiment. Controller node 306 can comprise a processor and associated circuitry to execute or direct the execution of computer-readable instructions to obtain information.

Gateway node 308 is a network element that can comprise a processor and associated circuitry to execute or direct the execution of computer-readable instructions, according to an exemplary embodiment. Gateway node 308 may retrieve and execute software from storage. Storage may include, for example, a disk drive, flash drive, memory circuitry, or some other memory device, that can be local or remotely accessible. According to an exemplary embodiment, the software comprises computer programs, firmware, or some other form of machine-readable instructions, and may include an operating system, utilities, drivers, network interfaces, applications, or some other type of software, including combinations thereof. According to an exemplary embodiment, gateway node 308 can provide to access nodes of system 300 (e.g., access node 304) instructions related to channel selection for communications with wireless devices (e.g., wireless device 302). For example, gateway node 308 can comprise at least one of a serving gateway (SGW), a packet data network gateway (PDNGW), a cellular gateway (CGW), and combinations thereof.

Communication network 312 can be capable of carrying data, for example, to support voice, push-to-talk, broadcast video, and data communications by a wireless device, such as wireless device 302. Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment. Communication network 312 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 312 comprise, for example, Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 320-324 can be wired or wireless communication protocols such as, for example, Internet, Internet protocol (IP), local-area network (LAN), optical networking, hybrid fiber coax (HFC), telephony, T1, or some other communication format, including combinations, improvements, or variations thereof, according to an exemplary embodiment. According to an exemplary embodiment, wireless communication links can be, for example, a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used than those specified in the various exemplary embodiments described herein. Wired communication links can be, for example, twisted pair cable, coaxial cable or fiber optic cable, or combinations thereof. Links 320-324 can be a direct link or may include various equipment, intermediate components, systems, and networks, according to an exemplary embodiment.

Other network elements may be present in the communication system 300 to facilitate wireless communication but are omitted for clarity, such as base stations, base station controllers, gateways, relays, mobile switching centers, dispatch application processors, and location registers such as a home location register or visitor location register. Furthermore, other network elements may be present to facilitate communication among access node 304, controller node 306, gateway node 308, multicast service center 310, and communication network 310 that are omitted for clarity, including, for example, additional processing nodes, routers, gateways, and physical and/or wireless data links for carrying data among the various network elements. In an embodiment, any of controller node 306, gateway node 308, multicast service center 310, and one or more modules of the access node(s) (e.g., access node 304) may perform all or parts of the method of FIG. 6, as illustrated in the various exemplary embodiments described herein.

Figure 2:
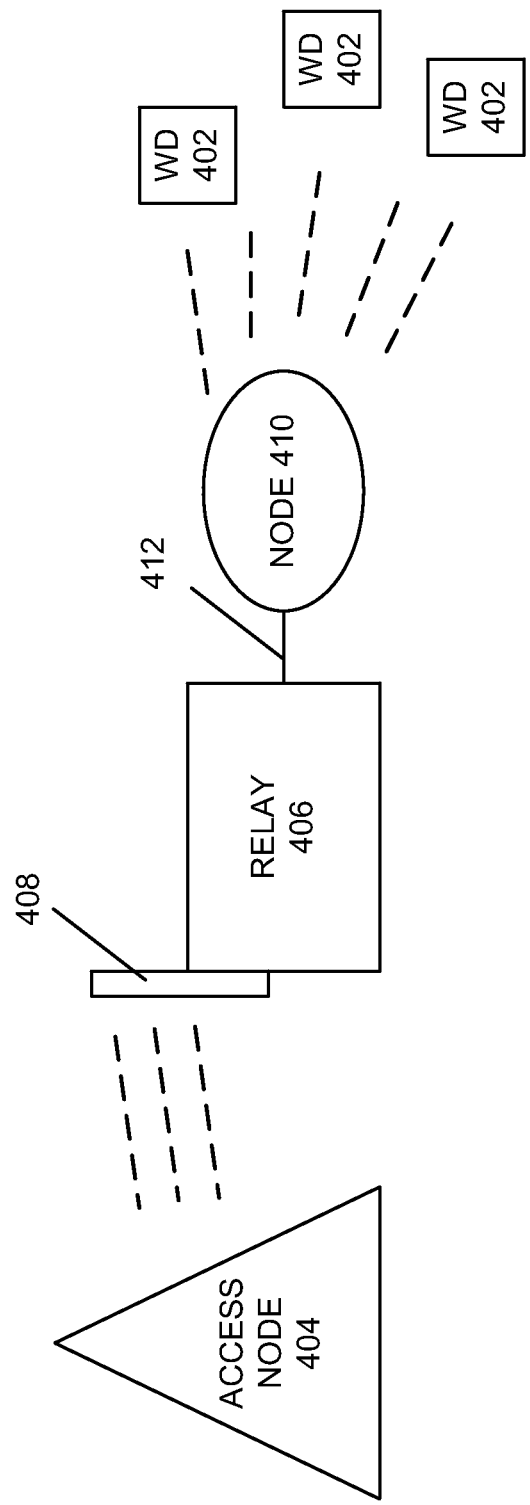
FIG. 2 illustrates an exemplary cell in communication with an access node via a relay.

Turning to FIG. 2, an exemplary embodiment of a cell access node 410 in communication with an access node 404 via a relay 406 is illustrated. Access node 404 may be an access node for a macro cell and may be similar to access nodes 304 of FIG. 3, according to an exemplary embodiment. According to an exemplary embodiment, access node 410 may be an access node for a small cell. Access node 410 may be similar to access node 304 of FIG. 3 but have a short range (e.g., smaller signal area), according to an exemplary embodiment. Access node 410 may be in communication with one or more wireless devices 402, which may be similar to wireless device 302 of FIG. 3. Access node 410 may be in communication with a relay 406 via a wired connection link 412, as shown in the exemplary embodiment of FIG. 2. Relay 406 may be in communication with the access nodes of other small cells such as access node 420 via wired connection link 414. In other exemplary embodiments, relay 406 may be in communication with the access nodes of one, two, three, four, five, six, seven, eight, or more small cells.

Traffic directed to and from the wireless devices 402 associated with the cells (e.g., access nodes 410) is carried by relay 406. For example, relay 406 may include an antenna 408 to communicate wirelessly with access node 404. Relay 406 may be used to provide wireless backhaul to the cells, which may be small cells. Some of the traffic carried by relay 406 may be tracking area updates for the various wireless devices 402 associates with the access nodes 410 connected to relay 406. Relay may include a processor configured to carry out the functions of the various exemplary embodiments described herein. For example, relay may include a processor and associated circuitry to execute or direct the execution of computer-readable instructions to obtain information, as described with respect to the various exemplary embodiments herein.

A communication system (e.g., network 108 or system 300) maintains a record of recent locations of wireless devices 402 in order to route paging messages to wireless devices 402, such as when data is sent to wireless devices 402. One method of maintaining a record of a recent location of a wireless device (e.g., wireless device 402) is by use of a tracking area. A tracking area consists of a group of access nodes which are associated with a tracking area code. In an embodiment, a communication system (e.g., network 108 or system 300) maintains a record of the access node that a wireless device communicated with most recently, as well as the associated tracking area code, and thus the associated tracking area, of that access node. A wireless device can be considered to be within the tracking area associated with the most recent access node. When a message, such as data, arrives for a wireless device, a paging message is sent to the access node most recently in communication with the wireless device.

Figure 3:
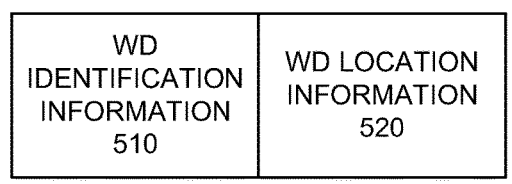
FIG. 3 illustrates an exemplary format for transmitting tracking area information.

Typically, when a wireless device moves from a first tracking area to a second tracking area, the wireless device sends a tracking area update (TAU) message to update the communication system of its new location. FIG. 3 shows an exemplary embodiment of a message format 500 for a conventional TAU message, which includes wireless device identification information 510 and wireless device location information 520. The message is sent by individual wireless devices (e.g., wireless devices 402 of FIG. 2) so that a communication system may identify which wireless device is sending a TAU and where (e.g., in which tracking area) the wireless device is located. Messages having format 500 are sent typically sent frequently, with short time intervals. In the exemplary embodiment of FIG. 2, when, for example, one of wireless devices 402 moves from the tracking area associated with access node 410 to a different tracking area (for example, if a wireless device 402 is handed over from access node 410 associated with a first tracking area to a second access node in a second tracking area), then the wireless device 402 will send a TAU message to the communication system through access node 410, which sends the TAU message to relay 406, which in turns send the TAU message to the communication system via access node 404.

As the number of wireless devices in communication with a communication system increases, TAU message volume can increase. For instances, as the number of access nodes 410 increases, and the number of wireless devices 402 in communications with the access nodes 410 increase, TAU message volume can increase. Further, paging messages may be sent to other tracking areas in an effort to find a wireless device, which increases the signal load for a communication network. For example, when a wireless device does not respond to a paging message sent to a first access node in a tracking area, such as within a predetermined period of time, a paging message is sent to other access nodes in the tracking area. As the volume of TAU increases, uplink congestion in both air interfaces and the communication network may result, as well as an increase in call controller processing. In other words, additional resources are used for TAU messages, which may otherwise be utilized for other purposes. A relay (e.g., relay 406) has limited resources for communication (e.g., with access node 404), so the use of the resources for TAU messages diminishes the amount of resources otherwise available for other transmissions, such as via the relay. Additionally, the more TAU messages a wireless device is required to send, the greater the drain on its battery. In view of these considerations, systems and methods for more efficient transmission of tracking area information would be desirable. Such systems and methods would permit more resources to be used for data transmission, such as via a relay.

Figure 4:
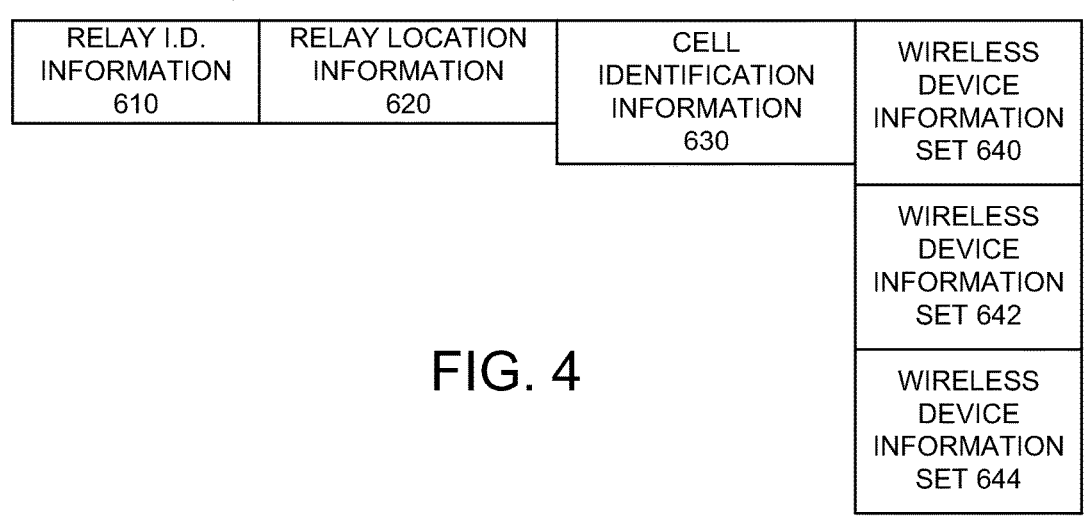
FIG. 4 illustrates an exemplary format for transmitting tracking area information for a plurality of cells.

Turning to FIG. 4, a message format 600 for a TAU is illustrated, according to an exemplary embodiment. Message format 600 includes relay identification information 610, relay location information 620, cell identification information 630, and wireless device information sets 640, 642, 644. Relay identification information 610 identifies which relay (e.g., relay 406) the message is associated with and location information 620 identifies the location of the relay, which typically does not change.

Cell identification information 630 identifies which cells (e.g., access anodes 410) are connected to the relay. According to an exemplary embodiment, cell identification information 630 includes information identifying a plurality of cells (e.g., small cells) associated with a relay (e.g., relay 406). As a result, a single TAU message using format 600 may include tracking information for a plurality of cells associated with a relay identified by relay identification information 610 (e.g., relay 406).

Each of wireless device information sets 640, 642, 644 includes the identification information for each wireless device associated with one of the cells (e.g., small cells) identified by cell identification information 630. For instance, wireless device information set 640 may include the tracking information for the wireless devices associated with a first cell identified in cell identification information 630, wireless device information set 642 may include the tracking information for wireless devices associated with a second cell identified in cell identification information 630, wireless device information set 642 may include the tracking information for wireless devices associated with a third cell identified in cell identification information 630, and so on.

The number of wireless devices associated with a respective cell may vary, such as according to the capabilities of the node (e.g., node 410) servicing the cell. For example, a small cell represented by wireless device information sets 640, 642, 644 may have a number of wireless devices of about 25 or less associated with the small cell. The various exemplary embodiments described herein may have other numbers of wireless devices connected with a cell represented by cell identification information 630, such as, for example, greater than about 25 wireless devices. Further, although only three wireless device information sets 640, 642, 644, corresponding to three cells identified via cell identification information 630, are illustrated in the exemplary embodiment of FIG. 4, other numbers of wireless device information sets may be included in message format 600. For example, one, two, three, four, five, six, seven, eight, or more wireless device information sets may be included in message format 600. According to an exemplary embodiment, the number of wireless device information sets included in message format 600 corresponds to the number of cells (e.g., access nodes 410) connected to a relay (e.g., relay 406).

In view of the exemplary embodiments disclosed herein, a TAU message using message format 600 may include not only information for a plurality of cells associated with a relay but also information for various wireless devices associated with each cell. As a result, systems and methods using message format 600 provide a more efficient manner of updating tracking information because the single message includes tracking information not merely for a single device but also for the various wireless devices associated with cells connected to a relay. The total volume of TAU messages using format 600 may use less bandwidth for a relay, as compared to TAU messages being sent for each wireless device (e.g., format 500), because messages using format 600 include a greater amount of information in a single message, so fewer TAU messages need to be sent. Thus, bandwidth for a relay may be freed from tracking information and may instead be utilized for data transmissions.

In addition, TAU messages using format 600 may be sent less frequently than messages sent for individual wireless devices (e.g., using format 500). According to an exemplary embodiment, tracking information may be accumulated over time for the various wireless devices associated with each cell connected to a relay. The accumulation may be accomplished by the cell (e.g., access node 410) or the relay (e.g., relay 406). According to an exemplary embodiment, tracking information may be accumulated from the various wireless devices until tracking information has been received from each wireless device, at which point a TAU message using format 600 is sent. Because TAU messages are sent less frequently, less bandwidth is used for tracking updates, overall, and more bandwidth may be used for data transmissions.

The wireless device information sets 640, 642, 644 may include the identity and location of the wireless devices associated with respective cells. According to an exemplary embodiment, the wireless device information sets 640, 642, 644 include the identity of each wireless device associated with a respective cell connected to a relay, but do not include the location of the wireless devices. Although wireless device location information is not included in wireless device information sets 640, 642, 644, a network is still informed of the tracking information for the various wireless devices because each wireless device is identified with relation to a specific cell (e.g., each of wireless device information sets 640, 642, 644 is associated with a particular cell identified in cell identification information 630) and the various cells are connected to a relay. The relay is identified via relay identification information 610 and the relay's location is known from relay location information 620 in message format 600. Further, relay locations do not generally change. According to an exemplary embodiment, the cells associated with the relay are small cells, which have similar locations as the relay due to the size of the small cells. Due to the compressed nature of messages using format 600, the messages, in their totality, use less bandwidth than messages using format 500 and are able to provide tracking information updates to a network.

According to an exemplary embodiment, location information for wireless devices is stored and not included in TAU messages (e.g., messages using format 600). Turning to FIG. 5, tables 700, 702, 704 are depicted that include stored wireless device tracking information, according to an exemplary embodiment. Tables 700, 702, 704 of tracking information can be stored, for example, by the relay or by the respective cells the wireless devices are associated with. Although only three tables 700, 702, 704 are depicted in the exemplary embodiment of FIG. 5, other numbers of tracking information tables may be used for the various exemplary embodiments described herein. For example, the number of tables may correspond to the number of cells (e.g., small cells) connected to a relay, with each of tables 700, 702, 704 including tracking information for the wireless devices of a respective cell.

As depicted in FIG. 5, each of tables 700, 702, 704 respectively include cell identification 710, 712, 714 to identify which cell the table corresponds to, wireless device identification information 720, 740, 760 to identify the wireless devices associated with the cells (e.g., wireless devices 721, 722, 741, 742, 761, 762), and wireless device relay area information 730, 750, 770 to identify where the wireless device is located within the coverage area of the relay (e.g., wireless device locations 731, 732, 751, 752, 771, 772). According to an exemplary embodiment, wireless device information 720, 740, 760 can use a radio network temporary identifier (RNTI)/international mobile subscriber identity (IMSI) format. Further, although information for two wireless devices is depicted for each table 700, 702, 704 in the exemplary embodiment of FIG. 5, the information for other numbers of wireless devices can be included in the tables. For example, the tables can include information corresponding to a number of wireless devices connected to the cell represented by the respective table.

As the tracking information for a wireless device changes, the corresponding tracking information in a stored table 700, 702, 704 is also changed, according to an exemplary embodiment. TAU messages (e.g., using format 600) sent by a relay can be based upon information in tables 700, 702, 704, such as by using cell identification information 710, 712, 714 and wireless device information 720, 740, 760. When a relay receives a paging message from a network for a particular wireless device, the relay may refer to tables 700, 702, 704 to determine which cell and relay area the wireless device is located in. As noted above, the wireless devices share the same location as a relay, so paging messages may be sent directly to the relay when a network pages a wireless device connected to one of the cells connected to the relay.

Figure 6:
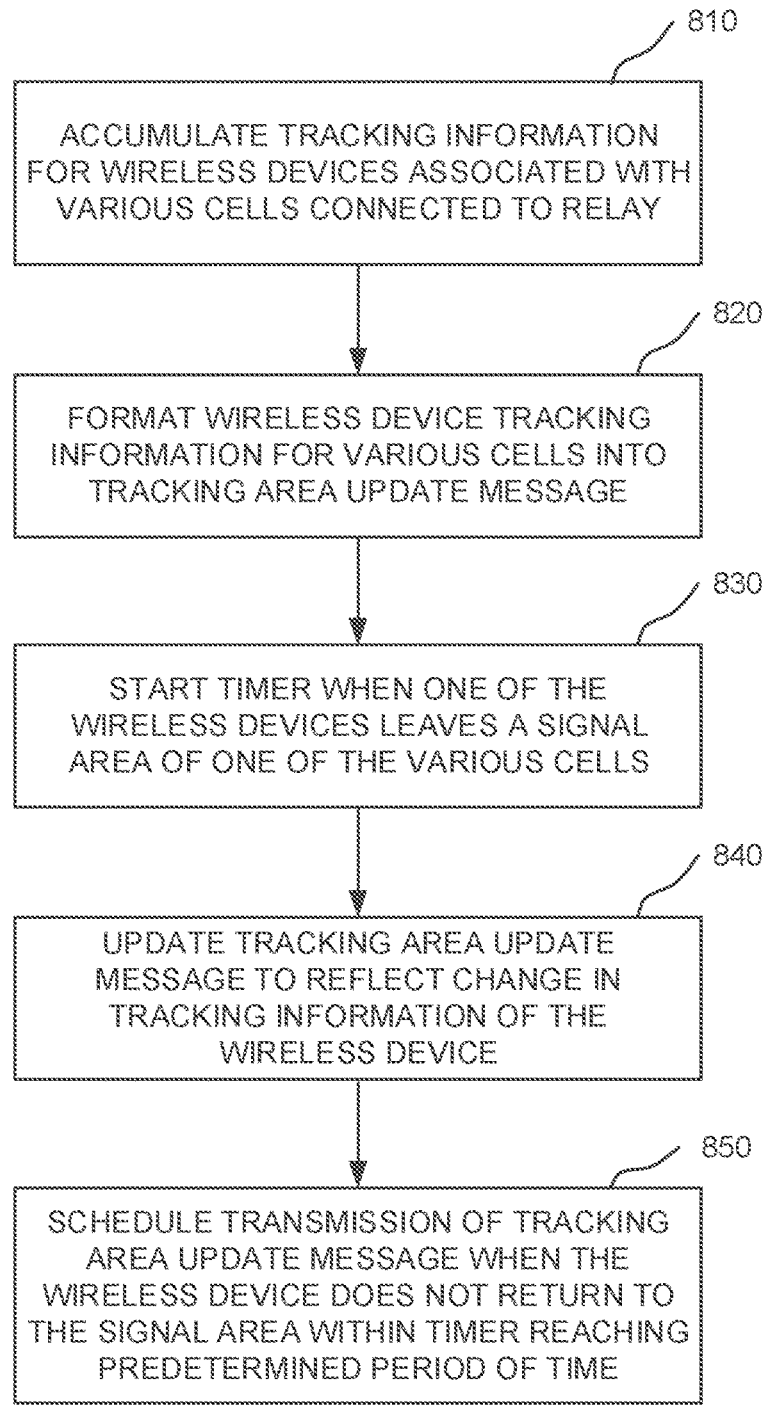
FIG. 6 illustrates an exemplary method of transmitting tracking area information.

FIG. 6 illustrates a method of updating tracking information for relay-based networks, according to an exemplary embodiment. In step 810, tracking information for wireless devices (e.g., wireless devices 402 in FIG. 2) connected to cells (e.g., node 410 in FIG. 2) that are connected to a relay (e.g., relay 406 in FIG. 2) is accumulated. For example, the tracking information is accumulated and stored in tables 700, 702, 704, as discussed above in regard to FIG. 5. In step 820, the tracking information for the wireless devices of various cells connected to the relay is formatted into a TAU message, such as by using format 600 of FIG. 6.

According to an exemplary embodiment, tracking information is transmitted using data resources. For example, when transmitting data between a relay (e.g., relay 406 of FIG. 2) and an access node (e.g., access node 404 of FIG. 2), the tracking information may be sent by using resources to transmit data between the relay and access node. Thus, tracking information may be sent using data resources instead of, for example, control resources. According to an exemplary embodiment, when the tracking information (e.g., for wireless devices of various cells connected to the relay) is formatted into a Tau message (e.g., in step 820 of FIG. 6), the tracking information are formatted to use resources of a data bearer between the relay and access node. Therefore, the formatting may be performed, for example, at the relay. When the information is received at the access node, the information may be processed (e.g., by access node 404) to separate the tracking information from any other data that may be transmitted with the tracking information using data resources, according to an exemplary embodiment.

At 830, when a wireless device moves out of the signal area (e.g., signal area 208) of a cell, the access node (e.g., node 204, 304, 410) will begin running a timer. At 840, the tracking area update message is updated to reflect the change in the tracking information of the wireless device that moved out of the signal area. If the wireless device does not return to the signal area within a predetermined time period, the access node will send the relay a tracking information update for the wireless device. A table (e.g., table of FIG. 5) including the tracking information for the wireless device is also updated. The relay updates a TAU message (e.g., using format 600) and, at 850, sends the TAU message. By using the predetermined time period, unnecessary TAU messages are reduced or eliminated, which frees bandwidth for data transmissions.

According to another exemplary embodiment, a mobility threshold may be utilized for determining when a sufficient number of wireless devices are mobile and a TAU message should be sent to update tracking information. For example, a relay or access node of a cell may determine whether wireless devices are mobile, such as by using the method using the predetermined time period discussed above. When a number of mobile wireless devices is equal to or greater than a predetermined threshold, a TAU message is sent to provide updated tracking information. For example, when the number of mobile wireless devices is equal to or greater than about 30% of the wireless devices of a cell or the total number of wireless devices serviced by a relay, a TAU message is sent.

Although the various exemplary embodiments have been described with regard to cells connected to a relay, the present disclosure contemplates cells not connected to a relay. For example, tracking information for the wireless devices of various cells (e.g., small cells) may be accumulated (such as by an access node of one of the cells) and sent in a single message. The single message may be similar to format 600 of FIG. 4 but not include relay identification 610 and location information 620 because a relay is not present.

Although the methods of the various exemplary embodiments described herein may perform steps in a particular order for purposes of illustration, the methods of the various exemplary embodiments discussed herein are not limited to any particular order or arrangement. One skilled in the art, using the disclosure provided herein, will appreciate that various steps of the methods can be omitted, rearranged, combined, and/or adapted in various ways.

Figure 7:
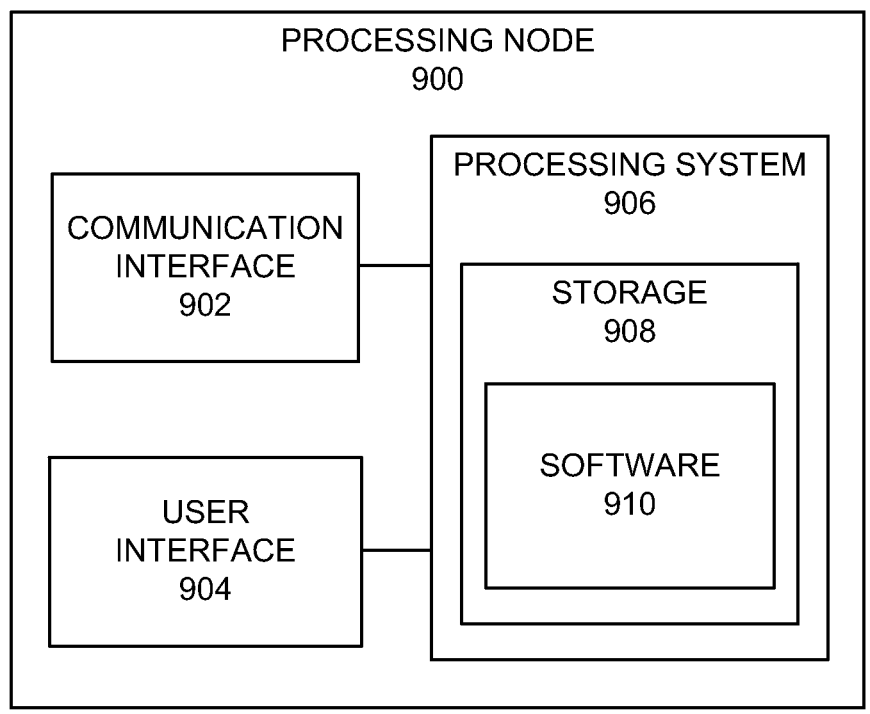
FIG. 7 illustrates an exemplary processing node.

The exemplary embodiment of FIG. 7 illustrates a processing node 900 of a communication system. Processing node 900 comprises communication interface 902, user interface 904, and processing system 906 in communication with communication interface 902 and user interface 904. Processing node 900 can be configured to determine, for example, a communication access node for a wireless device. According to an exemplary embodiment, processing system 906 includes storage 908, which can comprise a disk drive, flash drive, memory circuitry, or other memory device. Storage 908 can store software 910 used in the operation of the processing node 900, according to an exemplary embodiment. Storage 908 may include, for example, a disk drive, flash drive, data storage circuitry, or some other memory apparatus. Software 910 may include, for example, computer programs, firmware, or some other form of machine-readable instructions, including an operating system, utilities, drivers, network interfaces, applications, or some other type of software.

Processing system 906 may include, for example, a microprocessor and other circuitry to retrieve and execute software 910 from storage 908. Processing node 900 may further include other components such as, for example, a power management unit, a control interface unit, etc., which are omitted for clarity. According to an exemplary embodiment, communication interface 902 permits processing node 900 to communicate with other network elements. According to an exemplary embodiment, user interface 904 facilitates the configuration and control of the operation of processing node 900.

Examples of processing node 900 include, for example, controller node 306 and gateway node 308 of the exemplary embodiment of FIG. 1. According to an exemplary embodiment, processing node 900 can be an adjunct or component of a network element, such as an element of access nodes 104, 204, or 304, and the like. Processing node 900 can also be another network element in a communication system, according to an exemplary embodiment. Further, the functionality of processing node 900 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for updating tracking information for a relay-based network, the method comprising:
   accumulating tracking information for wireless devices connected to a plurality of cells that are connected to a relay,
      wherein the tracking information comprises locations of each of the plurality of cells to which the wireless devices have attached,
      wherein the tracking information does not include locations of the wireless devices, and
      wherein the relay and each of the plurality of cells are stationary with respect to their location;
   formatting the wireless device tracking information into a single tracking area update message for the wireless devices of the plurality of cells;
   running a timer when one of the wireless devices leaves a signal area of one of the cells;
   updating the tracking area update message to reflect a change in the tracking information of the one wireless device; and
   scheduling transmission of the tracking area update message when the one wireless device does not return to the signal area within a predetermined period of time.

2. The method of claim 1, wherein formatting the single tracking area update message comprises formatting the message to include identification information for the relay, location information for the relay, identification information for the plurality of cells, and tracking information for the wireless devices of each of the plurality of cells.

3. The method of claim 2, wherein formatting the single tracking area update message comprises formatting the tracking information for the wireless devices into groups according to a respective cell the wireless devices are connected to.

4. The method of claim 1, wherein the cells are small cells.

5. The method of claim 4, wherein the small cells are microcells, picocells, or femtocells.

6. The method of claim 1, further comprising preparing or updating tables that each correspond to a respective cell of the plurality of cells and each includes the wireless device tracking information for the wireless devices connected to the respective cell, wherein the wireless device tracking information of the tables includes wireless device identification information and relay area locations of the wireless devices.

7. The method of claim 6, wherein the relay prepares or updates the tables.

8. The method of claim 1, wherein the formatting the wireless device tracking information comprises formatting the wireless device tracking information to be transmitted using data resources.

9. A system for updating tracking information for a relay-based network, the system comprising:
   a relay comprising a processor;
   a plurality of access nodes connected to the relay;
   wherein the processor of the relay is configured to:
      accumulate tracking information for wireless devices connected to the plurality of access nodes;
      wherein the tracking information comprises locations of each of the plurality of access nodes to which the wireless devices have attached,
      wherein the tracking information does not include locations of the wireless devices, and
      wherein the relay and each of the plurality of access nodes are stationary with respect to their location;
      format the wireless device tracking information into a single tracking area update message for the wireless devices of the plurality of cells;
      run a timer when one of the wireless devices leaves a signal area of one of the cells; and
      update the tracking area update message to reflect a change in the tracking information of the one wireless device; and
      schedule transmission of the tracking area update message when the one wireless device does not return to the signal area within a predetermined period of time.

10. The system of claim 9, wherein the processor is further configured to format the tracking area update message to include identification information for the relay, location information for the relay, identification information for the plurality of cells, and tracking information for the wireless devices of each of the plurality of cells.

11. The system of claim 10, wherein the processor is further configured to format the tracking information for the wireless devices into groups according to a respective cell the wireless devices are connected to.

12. The system of claim 9, wherein the cells are small cells.

13. The system of claim 12, wherein the small cells are microcells, picocells, or femtocells.

14. The system of claim 9, wherein the processor is further configured to prepare or update tables that each correspond to a respective cell of the plurality of cells and each includes the wireless device tracking information for the wireless devices connected to the respective cell, wherein the wireless device tracking information of the tables includes wireless device identification information and relay area locations of the wireless devices.

15. The system of claim 9, wherein the processor of the relay is configured to format the wireless device tracking information to be transmitted using data resources.

* * * * *